United States Patent [19]
Chambers

[11] Patent Number: 5,383,114
[45] Date of Patent: Jan. 17, 1995

[54] METHOD FOR DISPLAYING A VOLUME OF SEISMIC DATA

[75] Inventor: Ronald E. Chambers, Houston, Tex.

[73] Assignee: Western Atlas International, Inc., Del.

[21] Appl. No.: 956,793

[22] Filed: Oct. 5, 1992

[51] Int. Cl.$^6$ ............................................. G01V 1/34
[52] U.S. Cl. ................................. 364/421; 395/140; 367/38; 367/73
[58] Field of Search ............... 364/420, 421; 367/37, 367/38, 50, 73; 395/140

[56] References Cited

U.S. PATENT DOCUMENTS

| | | | |
|---|---|---|---|
| 3,212,189 | 10/1965 | Savit . | |
| 3,697,938 | 10/1972 | Taner . | |
| 3,885,225 | 5/1975 | Anstey et al. . | |
| 4,072,922 | 2/1978 | Taner et al. . | |
| 4,241,429 | 12/1980 | Bloomquist et al. | 364/421 |
| 4,259,733 | 3/1981 | Taner et al. | 367/61 |
| 4,363,113 | 12/1982 | Taner et al. | 364/421 |
| 4,633,402 | 12/1986 | Flinchbaugh | 364/421 |
| 4,707,787 | 11/1987 | Savit | 364/420 |
| 4,964,097 | 10/1990 | Wang et al. | 364/421 |
| 5,046,504 | 9/1991 | Albert et al. | 128/696 |
| 5,092,341 | 3/1992 | Kelen | 364/413.06 |
| 5,211,179 | 5/1993 | Haberl et al. | 364/413.06 |
| 5,214,613 | 5/1993 | Esmersoy | 364/422 |
| 5,235,556 | 8/1993 | Monk et al. | 367/63 |
| 5,251,184 | 10/1993 | Hilberrand et al. | 367/72 |

OTHER PUBLICATIONS

Western Geophysical Co. Brochure, 1985, pp. 1-6, "Prestack Frequency Wavenumber (f-k) Migration".
"Computation and Interpretation of Seismic Attributes by Complex Trace Analysis"; Seiscom Delta Inc.; original publication date, 1975, Taner et al., pp. 1-29.
Encyclopedic Dietinary of Exploration Geophysics, 1991 Robert E. Sheriff pp. 61, 142, 186, 187, 222, 245.
Robert E. Sheriff, Encyclopedic Dictionary of Exploration Geophysics, (3rd Ed) pp. 47-48.

*Primary Examiner*—Gail O. Hayes
*Assistant Examiner*—J. L. Hazard
*Attorney, Agent, or Firm*—William A. Knox

[57] ABSTRACT

A method for displaying seismic attributes in an open three-dimensional format is provided. The conventional two-dimensional variable-amplitude traces that represent the magnitude of a selected seismic attribute as a function of time are converted to three-dimensional format. The three-dimensional converted traces are hung beneath a model of their corresponding data-gathering stations to provide a forest of seismic traces in a wire-frame environment. The open configuration of the seismic traces permits the interpreter to see a perspective view of the structure of the subsurface of the earth from any desired viewing angle.

7 Claims, 5 Drawing Sheets

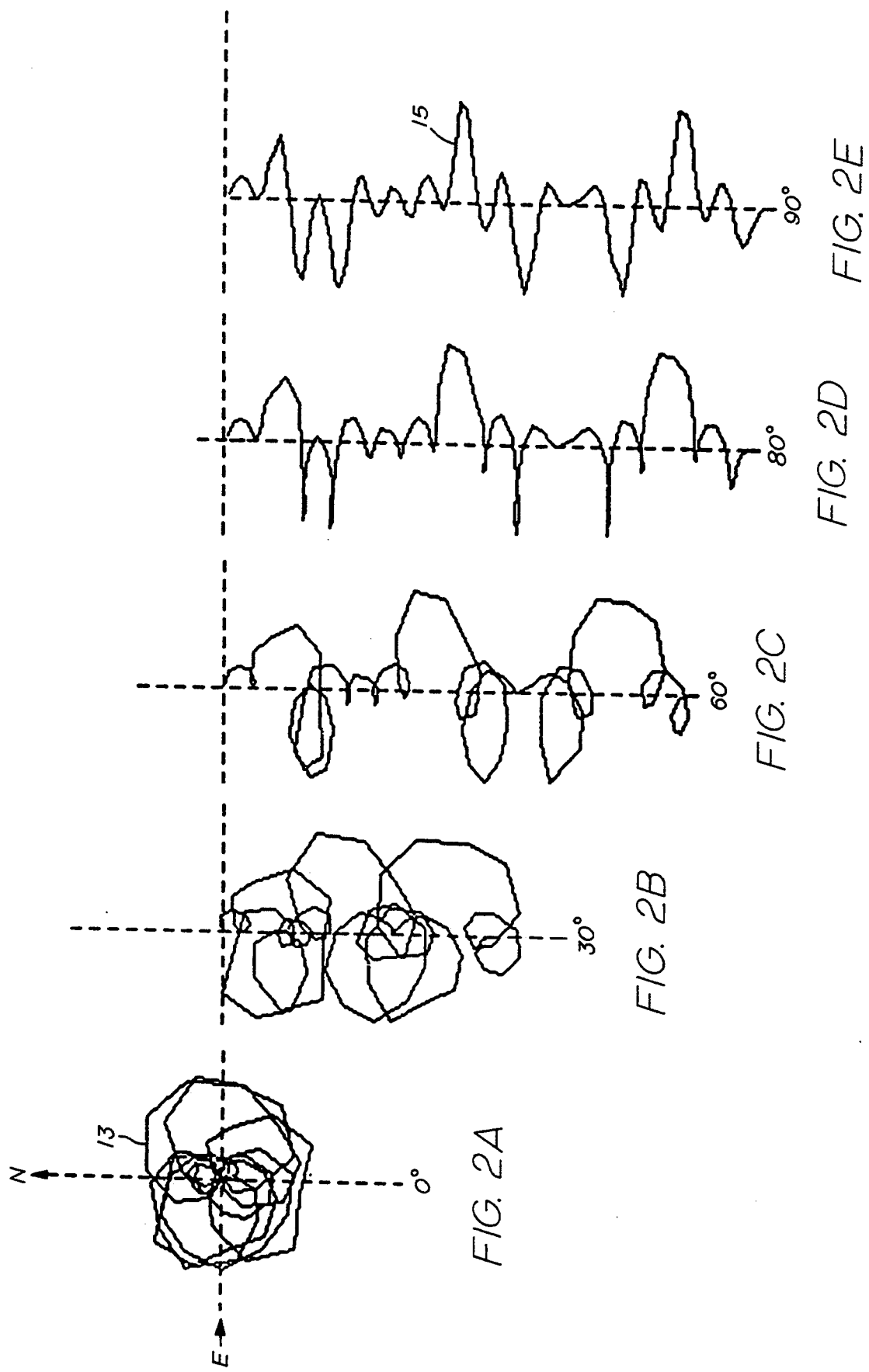

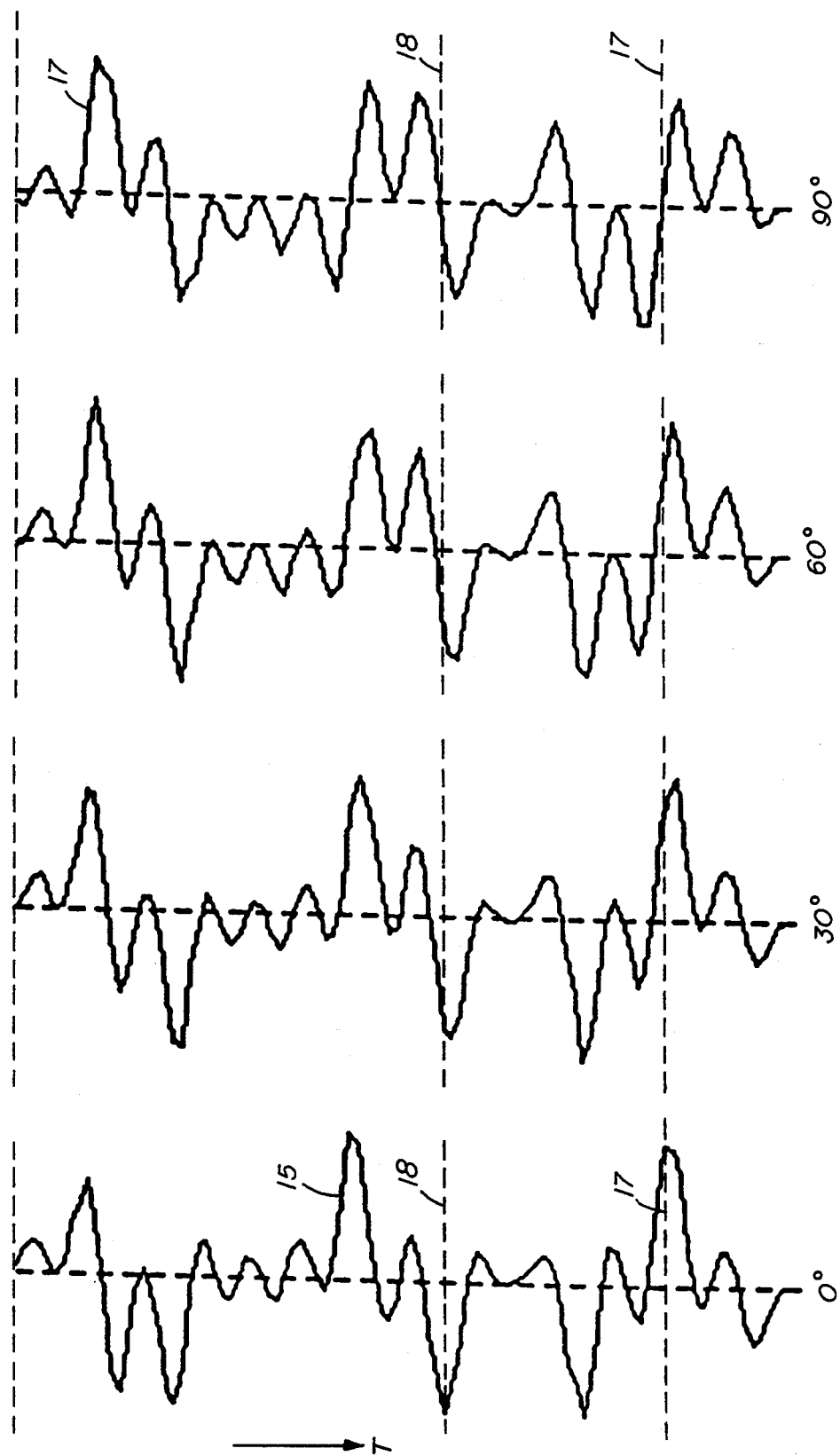

METHOD FOR DISPLAYING A VOLUME OF SEISMIC DATA

FIELD OF THE INVENTION

This invention relates generally to the field of seismic data processing and more particularly to a method for displaying 3-D seismic data in a wire-frame environment so that an interpreter can peer into the internal structure of a volume of data.

DESCRIPTION OF RELATED ART

To perform a seismic survey, a plurality of lines of profile are established over an area of interest. If a detailed three-dimensional (3-D) survey is to be made, the lines of profile are closely-spaced, typically a few tens of meters apart. Seismic receivers are distributed along the respective survey lines at observation stations that are separated by intervals corresponding to the line spacing. The seismic receiver stations thus form a symmetrical two-dimensional spatial grid having x-y axes over the area to be surveyed at or near the surface thereof.

At each of a plurality of source locations, an acoustic source is activated to insonify the subsurface. Wavefields emanating from the respective sources are reflected from subsurface earth layers. The reflected wavefields are detected by a receiver array that is designated to be associated with each source position. The seismic receivers convert the earth motions due to reflected acoustic wavefields into electrical signals which are preferably digitized and recorded on an archival storage medium as discrete data samples. The recorded discrete data samples are later processed by any well-known means.

Commonly, the processed data are displayed as a cross-section, that is, as a vertical slice of the earth in two dimensions whose axes are observation-station number along the spatial x axis and reflection travel time vertically along the z or time axis. If the acoustic velocity field is known, the vertical z axis may be expressed as depth rather than as reflection travel time. Because of the rectilinear grid that is characteristic of 3-D lines of profile, the cross sections may be oriented along any desired azimuth across the survey area. Such a cross section shows the structure of the earth beneath each station in the vertical x-z plane along the chosen azimuth, looking at the slice of the earth from one side.

Additionally, a horizontal two-dimensional slice of the earth, sometimes called a time slice, can be made at a selected reflection-time or depth level. The axes of the time slice are the spatial north and east (N-E) grid coordinates of the observation stations in the horizontal plane. A time or depth slice is a model of the structural relief of the earth at the chosen level, looking down from above.

It is customary to apply color coding to the cross sections, be they vertical or horizontal, for the purpose of distinguishing selected attributes of the seismic data. Such attributes may include reflection amplitude, reflection phase angle, acoustic propagation velocity, acoustic impedance or simply a demonstration of the structural attitude of a particular geologic horizon. Alternatively, attributes may be identified by means of gray levels of various densities rather than color. Typically, the gray-scale or color-scale coding takes the form of small rectangles printed on the display.

To examine the area under survey in three dimensions, a series of two-dimensional slices cut across the region of interest are employed. The problem here is that the details of any one slice obscure or tend to obscure the details of adjacent slices because the displays are relatively opaque due to the color coding. Furthermore, the color-coded rectangles often hide the delicate nuances of a variable amplitude seismic-trace (wiggle trace) envelope, that an interpreter needs to make proper analysis of the data.

Various methods have been used to demonstrate a true three-dimensional model of a region under study wherein the interpreter can see inside the data volume. U.S. Pat. No. 3,212,189, issued Oct. 19, 1965 to Carl H. Savit, teaches use of an egg-crate-type 3-D structure to model the relief of a portion of the ocean floor. That type of structural model could easily be adapted for use in displaying seismic time or depth slices, although any one display model is restricted to a single datum level.

Another method of displaying a 3-D volume of data is taught by U.S. Pat. No. 4,707,787, issued Nov. 17, 1987 to Savit et al. Here, a volume of transparent photosensitive material is provided. Two laser beams, orthogonally directed, intersect at specified tri-axial coordinates having as arguments, station coordinates along the horizontal axes; the two-way reflection time or depth of each discrete seismic data sample lies along the vertical time or depth axis. At each beam intersection, a molecule of the photosensitive material is somehow transformed into a voxel suspended within the volume. A three-dimensional image of the subsurface is built up from an accumulation of the voxels.

In U.S. Pat. No. 4,633,402, issued Dec. 30, 1986 to B. E. Flinchbaugh, the structure of selected geological horizons is displayed in a form having the appearance of layers of wire netting that are shaped to conform to the structural attitude of the respective horizons of interest. The intersecting lineations represent the arrangement of the original lines of profile.

As explained earlier, the seismic interpreter often can glean information from the characteristic pattern of variable-amplitude or wiggle traces that is obscured or absent from conventional 3-D displays. A variable-amplitude trace is inherently a two-dimensional entity. But seismic wavefields are three-dimensional. There remains a need for a method of displaying variable-amplitude seismic traces in a three-dimensional data volume such that the traces themselves exhibit three-dimensional characteristics.

SUMMARY OF THE INVENTION

This invention provides a method for displaying a plurality of seismic time-scale recordings in three dimensions. The time scale recordings may be a measure of any desired seismic-data attribute.

A reference surface is established with respect to which a plurality of seismic observation stations is mapped. The seismic data that are collected from the respective observation stations are processed to yield two-dimensional time-scale traces. Each such two dimensional time-scale trace is converted to a corresponding three-dimensional complex trace. The three-dimensional complex traces are hung beneath their respective observation stations to form a data volume in the form of a forest of seismic traces, which may be viewed in perspective from any desired viewing angle.

BRIEF DESCRIPTION OF THE DRAWINGS

The novel features which are believed to be characteristic of the invention, both as to organization and methods of operation, together with the objects and advantages thereof, will be better understood from the following detailed description and the drawings wherein the invention is illustrated by way of example for the purpose of illustration and description only and are not intended as a definition of the limits of the invention:

FIGS. 2A–2E illustrate the appearance of a complex time-scale trace of a seismic attribute as a function of the rotation of the time axis;

FIGS. 3A–3D illustrate the change in phase shift of the trace of FIG. 2E as a function of an observer's viewing orientation;

DETAILED DESCRIPTION OF THE PREFERRED EMBODIMENT

The present invention provides a method for displaying seismic signals (seismic data) in a three-dimensional format. Real or actual seismic signals are typically presented as time scale recordings in the form of real (variable) reflection amplitude versus two-way reflection time. As before mentioned, such traces are referred to as variable-amplitude or wiggle traces and are two-dimensional in nature. A seismic wiggle-trace display, however, is not limited to reflection amplitude. The magnitude as a function of time of any desired seismic attribute may be displayed in that fashion.

Each real variable amplitude trace has a unique associated complex trace. The complex trace F(t), is computed from the real seismic trace, f(t), by use of the formulation $$F(t) = f(t) + jf^*(t) = A(t)e^{j\gamma(t)}$$

where:

$jf^*(t)$ is an imaginary (quadrature) component which is uniquely determinable from f(t), A = envelope amplitude as a function of time, j = quadrature operator, and $\gamma(t)$ = instantaneous phase.

Figure 1:
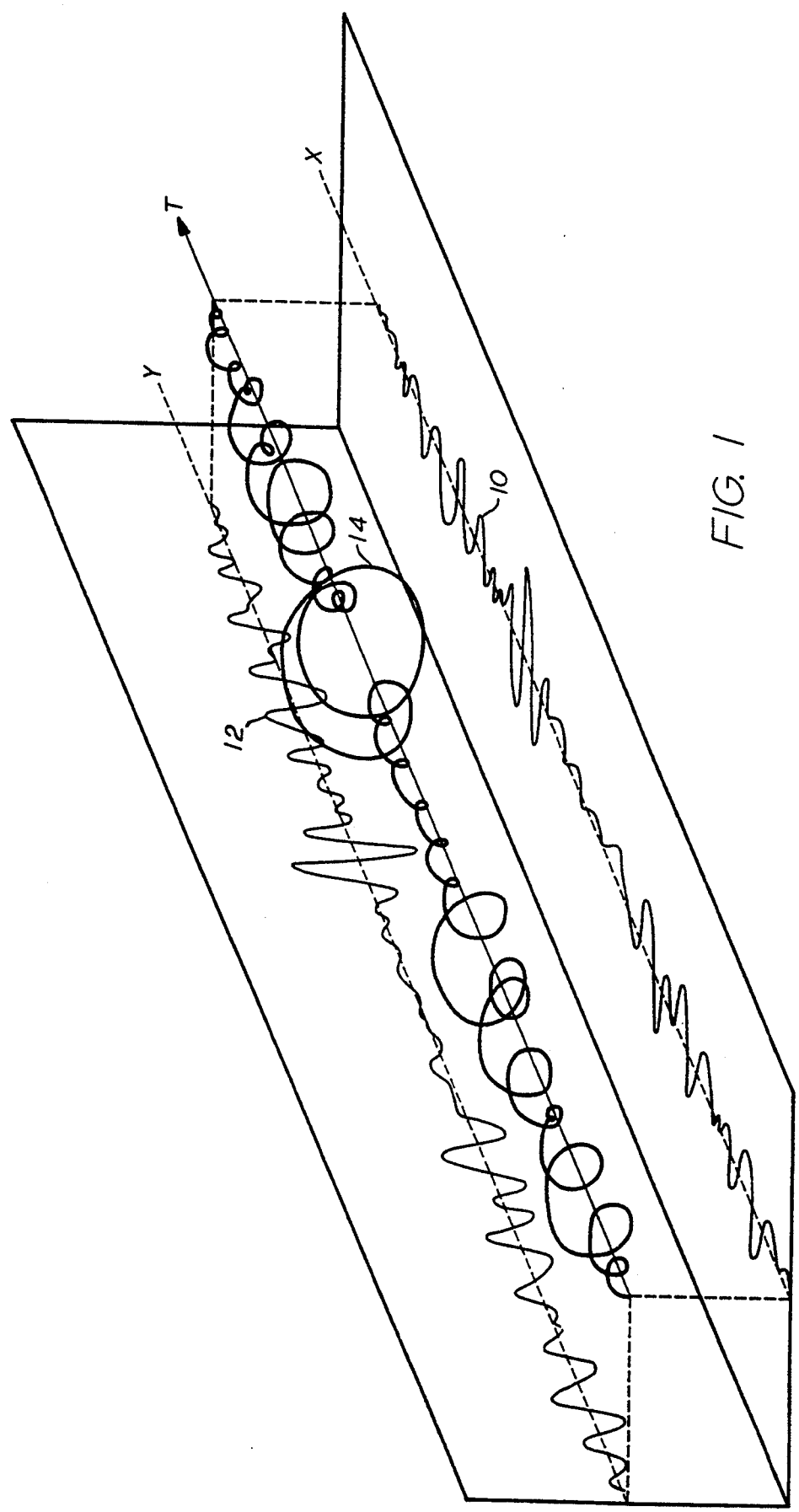
FIG. 1 shows an isometric view of the real and imaginary parts of a portion of a complex variable-amplitude seismic trace.

FIG. 1 shows an isometric view of a real variable-amplitude time-scale trace 10 of a selected seismic attribute, a quadrature trace (imaginary) 12 and a complex trace 14. This illustration is adapted from the *Encyclopedic Dictionary of Exploration Geophysics*, by R. E. Sheriff, 3rd Edition, 1991. The phase angle of the quadrature trace 12 lags the phase angle of the real trace 10 by a quarter cycle or 90°. The complex trace 14 becomes a three-dimensional spiral because the x coordinate is the amplitude of the real trace, the y coordinate is the amplitude of the imaginary trace and the T coordinate is ever-increasing two-way wavefield travel time.

Referring again to FIG. 1, if one looks directly along complex trace 14 from the left hand end, the spatial configuration complex trace appears to describe a hodogram. A hodogram is defined as the figure traced out by the terminus of a moving vector. When examined in a wire-frame-type environment, the three-dimensional structure of a complex trace is viewable from all directions. A two-dimensional trace, such as trace 10, on the other hand, when viewed sideways rather than broadside, would be a straight featureless line.

The term "wire-frame environment," such as trace 10, is a term of art meaning conceptually, that an analog model of each seismic trace of an array of seismic traces could be formed by bending a wire in the shape of the wiggles. If the bent-wire models of all of the seismic traces are hung beneath the reference surfaces from the grid points corresponding to their respective observation-station-of-origin locations as mapped on the reference surface, a data volume resembling a forest of seismic traces will be formed. This three-dimensional forest of seismic traces may be then examined from any desired viewing location.

FIGS. 2A–E illustrate the appearance of a complex variable-amplitude seismic trace as it is rotated about the East-West axis. In FIG. 2A, the intersection of the dashed lines represent the location of a seismic observation station, as mapped on a reference surface, in terms of north and east spatial coordinates. A complex seismic trace has been derived from the observed data and plotted as a hodogram 13. The length of a radius vector extending from the origin to any position on the hodogram represents instantaneous trace amplitude. The T or time axis T extends away from the observer, perpendicularly to the page.

In FIGS. 2B to 2E, the N-S plane of FIG. 2A is tilted away from the observer, about the E-W spatial axis, by successive angular increments of 30, 60, 80 and 90 degrees. In FIG. 2E, the T axis is vertical. After intermediate character transitions, the hodogram 13 of FIG. 2A assumes the conventional appearance of a seismic trace 15 as shown in FIG. 2E. In FIG. 2E, the trace 15 is shown broadside, from the south side looking north. As is well-known, a seismic time-scale recording may extend for many seconds. In this and in the remainder of the figures, the length of the illustrated traces represents an arbitrary wavefield travel-time window having upper and lower limits that are chosen for purposes of example only and not by way of limitation.

FIGS. 3A–D show trace 15 of FIG. 2E when it is viewed from different directions, walking around the trace counter-clockwise by increments of 30 degrees. FIG. 3A shows the trace 15 of FIG. 2E, while FIG. 3E shows the trace 15 when it is turned counter-clockwise by 90 degrees. Thus trace 17 of FIG. 3D is a broadside view of three-dimensional trace 15, but this time from the east side looking west. Dashed lines 18 and 19 are drawn to demonstrate the change in phase as a function of the viewing direction. In fact, the change in phase angle creates a change of the character of the respective traces showing that this method indeed provides seismic traces that themselves have three-dimensional characteristics.

Figure 4:
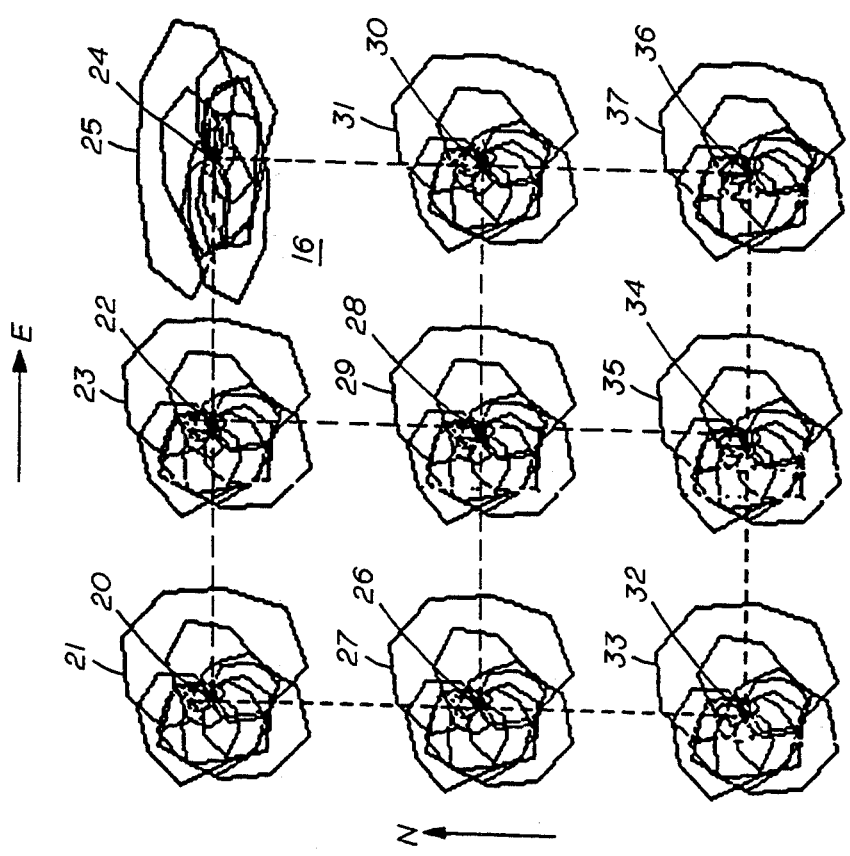
FIG. 4 shows a plan view of the complex traces of an array of observation stations areally distributed over a N-E reference plane.

FIG. 4 illustrates a plan view of a patch of nine observation stations mapped over reference grid having north and east coordinates looking down as from a great height. The observation stations are numbered from 20 to 36 in even numbers.

Corresponding complex-trace hodograms 21–37 (odd numbers) are drawn at each location. The T axis extends perpendicular to the page below a reference plane 16 which may coincide with the surface of the earth or it may coincide with any other selected level in the geologic column. Hodogram 25 has a pattern that is different than that of the other traces because a noise transient has contaminated the data. The patch of observation stations as plotted along the North and East axes, combined with the seismic traces extending along the time axis form a three-dimensional volume of data. In this Figure and following FIGS. 5–7, it is important not to confuse the spatial scaling in the N-E coordinates of the observation stations with the arbitrary scaling used to quantify the radii vectors of the complex seismic traces.

Figure 5:
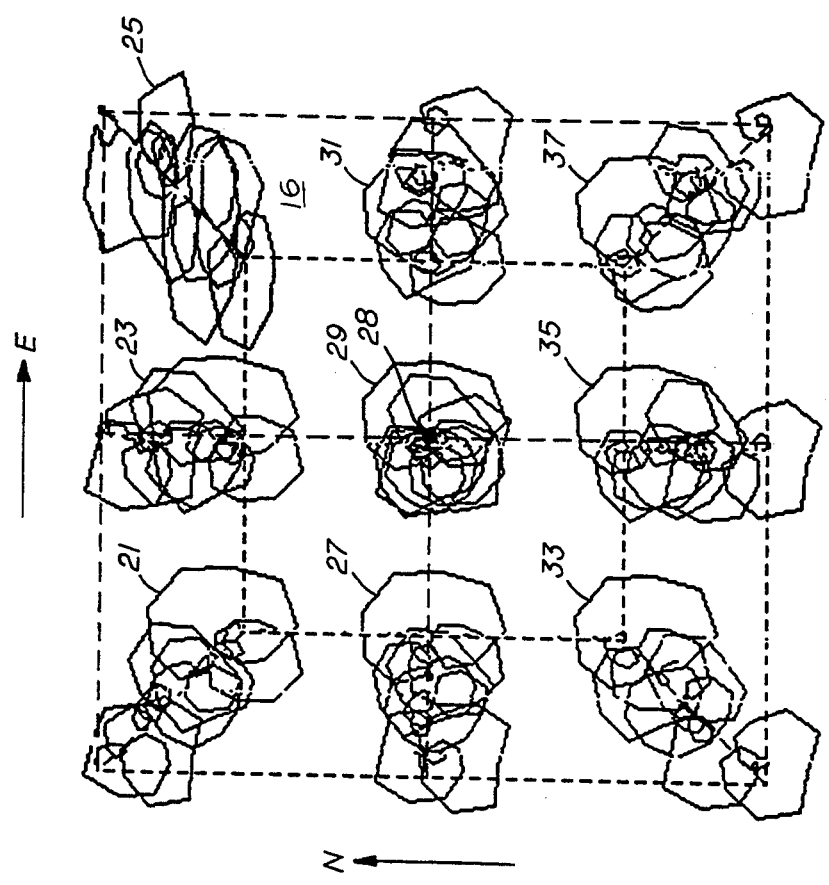
FIG. 5 shows a close-up isometric plan view of a volume of data as seen from directly above the midpoint of the array of FIG. 4 with that time axis aligned perpendicularly to the page.

FIG. 5 is a close-up look at the isometric plan view of FIG. 4, looking directly down into the data volume from a point directly over station 28 in the center of the patch. The view is similar to what would be seen looking down a large-diameter dug water well with the data being hung down around the wall of the well.

Figure 6:
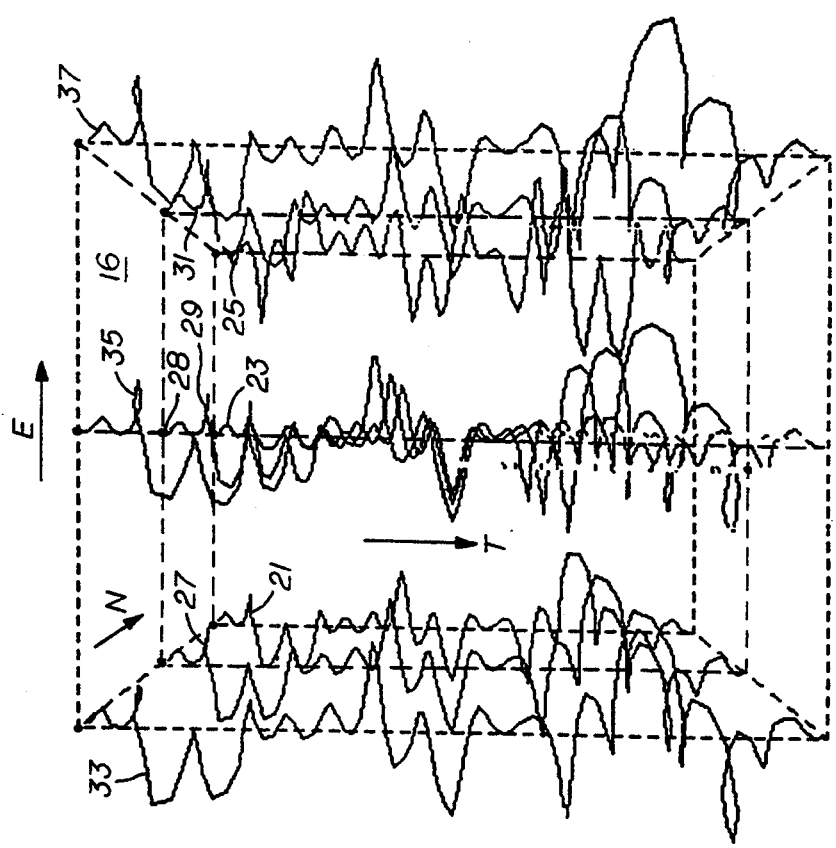
FIG. 6 shows a close-up isometric side view of the data volume of FIG. 4 looking north from the south side after the reference plane has been tilted away from the observer so that the time axis is vertical.

FIG. 6 shows a close-up isometric side view of the data volume of FIG. 4 looking north from the south side after the reference plane has been tilted 90 degrees away from the observer so that the time axis is vertical. This is an isometric view from the middle of the south side of the data volume, looking towards the north. With the viewpoint at the very center of the south side, traces 23, 29 and 35 overlap near the center and spread out and separate towards the top and bottom of the data volume. The traces have the conventional wiggle appearance near the center but tend to assume three-dimensional spiral characteristics at the sides as seen by peripheral vision. The noise transients on trace 25 are apparent.

Figure 7:
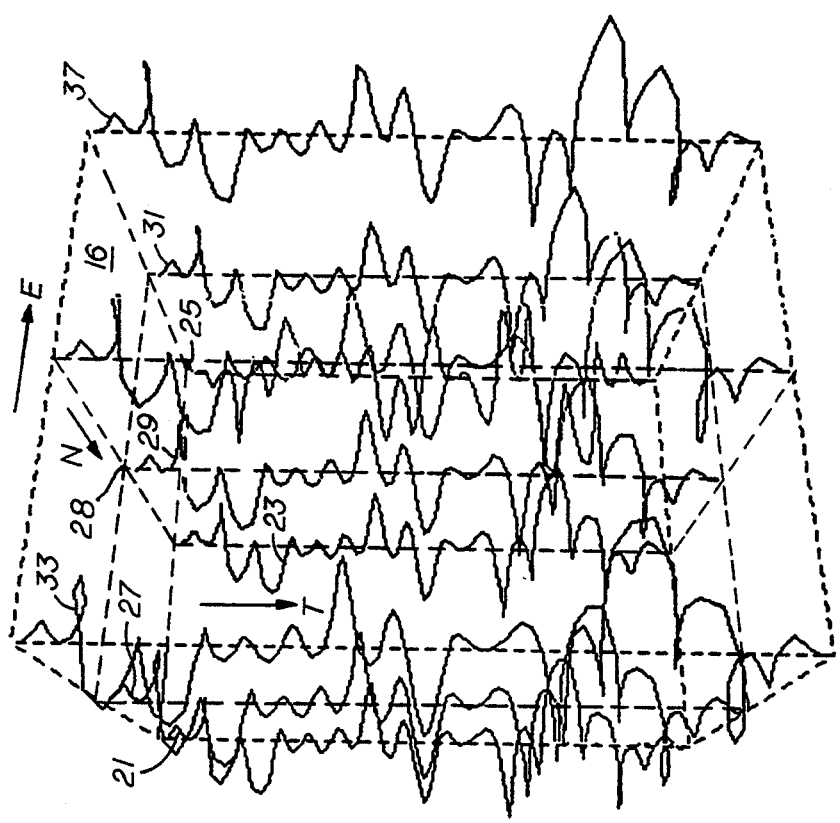
FIG. 7 shows a close-up isometric view of the data volume of FIG. 4 looking northward along the west side of the data volume.

FIG. 7 is an isometric side view similar to that of FIG. 6 except that the viewpoint is located near the center, looking along the west side of the data volume towards the north.

Thus, in a preferred method of operation, a three-dimensional model of selected attribute or parameter of the subsurface of the earth is provided by establishing a reference surface over which a selected plurality of seismic observation stations is mapped. The seismic data collected at each of the respective seismic observation stations are processed by any desired method as a variable-amplitude time-scale trace that is unique to its seismic observation station of origin thereby to yield a plurality of two-dimensional seismic traces. The trace amplitude at any selected wave field travel-time window constitutes a quantitative measure of the magnitude of a desired seismic attribute corresponding to a physical parameter of the subsurface of the earth within that travel-time window. The two-dimensional seismic traces are converted to corresponding three-dimensional complex traces by any well-known formulation such as that given earlier. The respective three-dimensional complex traces are hung beneath the mapped locations of their respective observation stations of origin to form a three-dimensional volume of data formatted as a forest of seismic traces. With the aid of any well-known image-manipulation computer program, such as, by way of example but not by way of limitation, AutoCAD, a registered trademark of Autodesk Inc., the forest of seismic traces may be examined in perspective from any desired viewing angle.

For ease of identification, the lines representing individual traces may be drawn in color rather than black-and-white as shown in the drawings.

This invention has been described in terms that are exemplary only and in no way limit the scope and spirit of the invention. The attributes that may be displayed by these teachings include but are not limited to reflection strength, formation impedance, wave field propagation velocity and relative phase angle as applied to compressional waves, shear waves or any other type of seismic wave propagating through solid or fluid media. The invention has been described in terms of three-dimensional surface-surveying but it could also be applied to vertical seismic profiling. The reference surface herein contemplated may coincide with the physical surface of the earth, with the water surface in marine surveying or is may simply be some convenient geologic reference datum above or beneath the physical surface. This invention is limited only by the appended claims.

What is claimed is:

1. An interactive computer-graphics implemented method of displaying seismic attributes of the subsurface of the earth in three-dimensional format, comprising the steps of:
   (a) establishing a reference surface;
   (b) mapping the locations of a selected plurality of seismic observation stations over said reference surface;
   (c) collecting, in a computer memory, seismic data from each of the respective seismic observation stations, said seismic data being formatted as two-dimensional variable-amplitude time-scale traces;
   (d) in a data processor, converting the two-dimensional variable-amplitude time-scale traces to corresponding complex seismic traces; and
   (e) using a computer graphics program, displaying each said complex seismic trace beneath its corresponding mapped seismic observation station of origin to create a three-dimensional model of attributes of a volume of the subsurface of the earth formatted as a forest of seismic traces.

2. The method of claim 1, wherein the forest of seismic traces is displayed in perspective from any desired viewing angle.

3. An interactive computer-graphics implemented method of displaying seismic data, comprising the steps of:
   (a) distributing a plurality of seismic observation stations over a spatial coordinate grid;
   (b) propagating an acoustic wave field from a source location relative to said grid;
   (c) from each of the seismic observation stations, gathering into a computer memory, the seismic data resulting from the propagation of said wave field and processing the gathered data as a function of the magnitude of a selected seismic attribute versus travel time to provide a two-dimensional seismic time-scale trace corresponding to each of the seismic observation stations;
   (d) converting each of the two-dimensional time-scale seismic traces to a corresponding three-dimensional complex time-scale trace;
   (e) establishing a reference surface;

(f) mapping the locations of said seismic observation stations relative to said reference surface; and (g) using a computer-graphics program, exhibiting each of the three-dimensional complex seismic time-scale traces beneath the mapped location of its corresponding seismic observation station of origin, to display a three-dimensional model of a volume of the earth in terms of said selected seismic attribute as a forest of seismic traces.

4. The method as defined by claim 3, comprising: providing a perspective view of the forest of seismic traces from any desired viewing angle to simulate an open wire-frame representation of said volume of the earth.

5. A computer-graphics implemented method for displaying a volume of seismic data, comprising:
 (a) obtaining seismic data formatted as a plurality of two-dimensional seismic time-scale traces from each one of a corresponding selected plurality of seismic observation stations;
 (b) within a selected time window having upper and lower time-scale boundaries, converting in a data processor said plurality of two-dimensional seismic traces to corresponding three-dimensional complex time-scale seismic traces;
 (c) using a computer graphics program, displaying each said complex three-dimensional time-scale seismic trace from a reference surface beneath the mapped location of its corresponding station of origin from among said selected plurality of observation stations such that the upper boundary of said time window embracing each said complex time-scale seismic trace coincides with said reference surface.

6. A computer-implemented method for processing seismic data, comprising:
 a) distributing a plurality of seismic receiver stations at known positions over an area of interest;
 b) propagating a seismic wavefield from a source location;
 c) receiving said seismic wavefields at said receiver stations after reflection of said seismic wavefield from subsurface earth formations and storing the received wavefields in a computer memory as two-dimensional time scale traces;
 d) processing said stored received wavefields to generate a set of three-dimensional time-scale traces;
 e) reducing said set of three-dimensional traces to a common reference surface;
 f) forming a three-dimensional model of a volume of the subsurface of the earth by using a computer-graphics program to display each three-dimensional trace of said set beneath the known position of the receiver station of origin.

7. The method as defined by claim 6, comprising: using said computer-graphics program, displaying said three-dimensional model in perspective from any desired viewing angle.

\* \* \* \* \*